March 3, 1970     T. A. WHATLEY     3,498,113
METHOD AND APPARATUS FOR DETERMINING SOLUTE CONCENTRATIONS
Filed Aug. 27, 1968
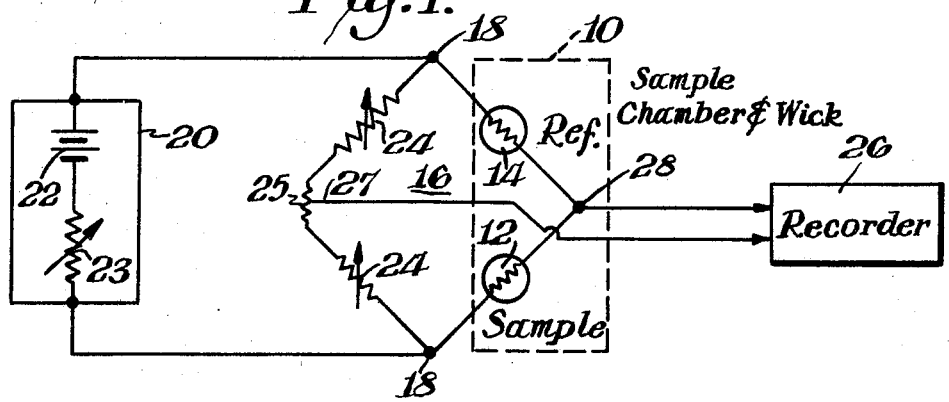
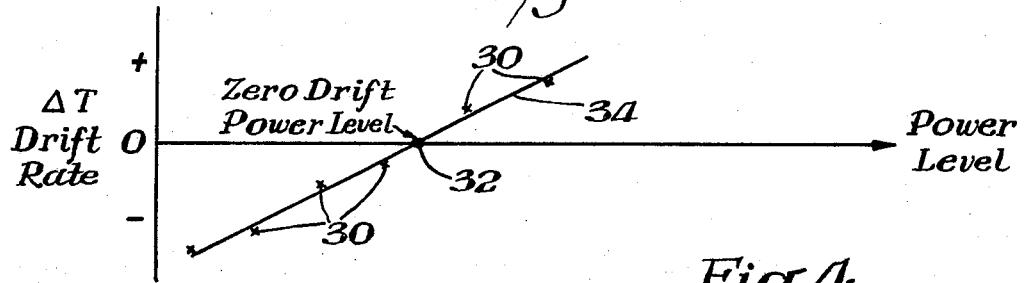
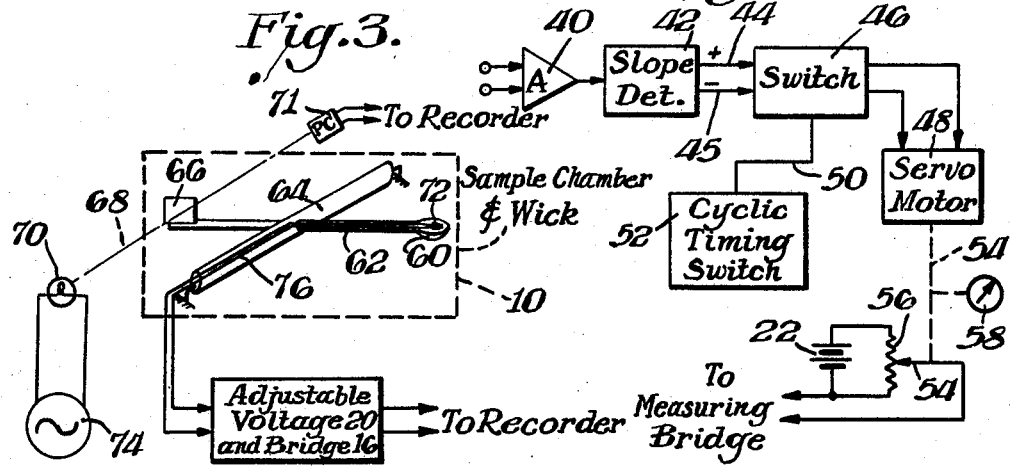
INVENTOR.
Thomas A. Whatley
BY
Mortenson and Weigel
ATTORNEYS

United States Patent Office 3,498,113
Patented Mar. 3, 1970

3,498,113
METHOD AND APPARATUS FOR DETERMINING SOLUTE CONCENTRATIONS
Thomas A. Whatley, Northridge, Calif., assignor to Hewlett-Packard Company, Palo Alto, Calif., a corporation of California
Filed Aug. 27, 1968, Ser. No. 755,535
Int. Cl. G01n 13/04
U.S. Cl. 73—64.3          6 Claims

ABSTRACT OF THE DISCLOSURE

Solute concentrations are determined by placing a sample of a solution containing the solute in question and a solvent for the solute in a closed chamber. The normal temperature increase of the solution sample due to vapor condensation is altered by a heater contiguous to the solution. The solution sample is heated to overcome the normal heat losses. This permits the sample to approach a true thermodynamic equilibrium where its vapor pressure equals the vapor pressure of the solvent. The solute concentration is determined by measuring the temperature increase of the sample solution once the sample's temperature, volume, or weight has achieved a zero draft rate.

---

This invention relates to osmometers and, more particularly, to a method and apparatus for determining the molecular weights of materials utilizing temperature measurements related to the osmotic pressure of the sample solution.

Background of the invention

For a number of years the average molecular weight of different materials has been determined by measuring the osmotic pressure of a solution of the material dissolved in a suitable solvent. Various techniques have been employed; some utilizing a membrane, others utilizing a vapor gap. These techniques have included both automatic and manual methods. Unfortunately many of these prior art techniques and instruments for using such techniques have been generally unsatisfactory for a number of reasons.

For example, many osmometers measure the heat effect, i.e., the temperature increase, resulting from the condensation of solvent vapor that takes place when a sample solution is exposed to the vapor of the solvent used for that solution. The resulting temperature rise of the solution is related to the molal concentration of the solution. Utilizing known formulae, the molecular weight of the solute can eventually be obtained.

In practice, the precise temperature increase, or what may be termed the full thermodynamic response, is difficult to obtain because of the inevitable heat losses of the sample solution to its surroundings. Often calibration utilizing known sample concentrations can be used to correct for many of these losses, but since the temperature increase in a complex function of many variables, precise results are never completely assured. It would be far preferable if the temperature increase caused by such condensation could take into account the full thermodynamic response of the solution without the need for calibration and compensation for the heat losses. It would be particularly desirable if the full temperature change necessary to obtain thermodynamic equilibrium, could be measured, i.e., the temperature difference existing when the vapor pressure of the sample solution precisely equals that of the pure solvent.

Accordingly, it is an object of the invention to obviate many of the disadvantages of the prior art osmometers.

Another object of this invention is to provide an improved osmometer.

Another object of this invention is to provide an improved method of determining solution concentrations.

Summary of the invention

According to the preferred method of this invention, the concentration of a sample material solution is determined by placing the sample solution and the same solvent as used in the solution in a closed chamber. Heat is applied to the sample solution until its vapor pressure substantially equals that of the solvent. This is the point of thermodynamic equilibrium. By measuring the sample temperature increase, the molal concentration of the solution is determinable and from this, the molecular weight of the sample solute can be ascertained. The equality of vapor pressures is determined by measuring the drift rate of the temperature, the volume, or the weight of the sample under test. When any of these drift rates approach zero, the desired thermodynamic equilibrium is indicated.

In one preferred apparatus for performing this method, a small sample volume in the form of a single drop of the solution under test is suspended on a thermistor bead. The thermistor bead is located in a closed chamber having a wick wetted with the same solvent as used in the solution thus providing an atmosphere saturated with the solvent vapor. The thermistor bead is part of a bridge measuring circuit. To increase the heat applied to the sample, the voltage or current input to the bridge is increased until the drift rate with time of the measured temperature difference between the sample and reference beads approaches zero, i.e., the temperature difference approaches a constant value.

In an alternative embodiment of the invention the sample is placed on a balance of high sensitivity and heated. Once the change of sample weight stabilizes thermodynamic equilibrium is achieved. The temperature change produced by solvent condensation on the sample bead again is a factor from which the molal concentration and hence the molecular weight can be determined.

Brief description of the drawings

The novel features that are considered characteristic of this invention are set forth with particularly in the appended claims. The invention itself, however, both as to its organization and method of operation, as well as additional objects and advantages thereof, will best be understood from the following description when read in connection with the accompanying drawings in which:

FIGURE 1 is a partial schematic and partial block diagram of the preferred embodiment of an instrument which is capable of performing the method of this invention;

FIGURE 2 is a plot of the temperature drift rate of the sample solution as the ordinate versus heat applied to the sample solution in the schematic of FIG. 1 illustrating the point of thermodynamic equilibrium;

FIGURE 3 is a partial diagrammatic and partial block diagram of an alternative embodiment of the invention illustrating the use of a balance to ascertain thermodynamic equilibrium; and FIGURE 4 is a partial block and partial schematic diagram of a feedback circuit which may be employed in conjunction with the diagrammatic illustration of FIG. 1 to provide an automatic system for establishing thermodynamic equilibrium between the sample solution and its solvent.

DETAILED DESCRIPTION OF THE PREFERRED EMBODIMENT

The instrument illustrated in FIG. 1 is a vapor pressure osometer capable of determining the number-average molecular weight of a non-volatile substance (solute) dissolved in a liquid (solvent). This vapor pressure osmometer operates on the principle of vapor pressure lowering. The vapor pressure of a pure solvent is lowered by the addition of a solute, a collagative property of the solution that is dependent primarily on the number of dissolved molecules and not on their chemical characteristics. The system includes a sample chamber and wick, illustrated by the dotted rectangle 10, which may be of conventional type. One suitable chamber and wick arrangement could be that described in the "Operating and Service Manual—Model 302B Vapor Pressure Osmometer," published by Hewlett-Packard Company, Avondale Division, Route 41 and Starr Road, Avondale, Pa., 19311, copyright 1968. As described in this manual, the sample chamber is formed in an aluminum block which chamber houses a solvent cup at the lower portion thereof. The solvent cup is in the form of two co-axially disposed cylinders which support a solvent wick of a suitable fibrous material having a large surface area such as asbestos.

Suitably disposed in the upper portion of this sample chamber above the wick are a pair of temperature sensing thermistor beads designated respectively as the sample bead 12 and the reference bead 14. The sensing thermistor beads are mounted on fine, usually 0.004 inch, platinum wire to minimize thermal conduction losses and are precisely aligned to allow the application of a droplet of the solvent to the reference bead and a droplet of the sample solution to the sample bead. These droplets are placed on the beads by suitable syringes inserted through permanent ports in the sample chamber.

Other suitable sample chambers may be used as desired but that described is one that has been successfully used. The thermistor beads 12 and 14 form part of a measuring bridge circuit 16 which may be a conventional Wheatstone bridge. Although a Wheatstone bridge measuring circuit is described, it is to be understood that other known temperature measuring systems may be used as well. The bridge 16 has a pair of input terminals 18 to which an energizing voltage from a variable voltage source 20 is applied. The voltage source 20 may include, for example, a source of potential illustrated by the battery 22 and an adjustable resistor 23 connected in series. The thermistor beads 12 and 14 each are connected in a different arm of the bridge with the aid of adjustable resistors 24 and the terminals 18. To complete the bridge, a pair of adjustable resistors 24 are connected in series with a potentiometer 25 across the input terminals 18 and in parallel with the series connected thermistors 12 and 14. The potentiometer 25 has a tap 27 which may be used for zeroing the bridge and provides one of the output terminals of the bridge. The remaining output terminal of the bridge, designated 28, is the junction between the series connected thermistor beads 12 and 14. The output terminals 27 and 28 of the bridge 16 are connected to any suitable output circuitry which may include amplifiers and, if desired, a recorder illustrated by the rectangle 26. A suitable measuring circuit may be that illustrated by FIG. 4–2 of the Hewlett-Packard "Operating and Service Manual" referred to hereinbefore.

In accordance with the method of this invention, the osometer illustrated in FIG. 1 is operated initially in a normal manner by first saturating the sample chamber with solution solvent in a conventional manner, applying solvent to both thermistor beads 12 and 14 and balancing the bridge with the aid of adjustable resistors 24 and the potentiometer 25. Next a drop of the sample solution under test is applied to the sample bead 12. Once balanced, the output electrical signal derived from the output terminals 27, 28 of the bridge 16 varies in amplitude according to the temperature of the sample thermistor bead 12 relative to the reference bead having a drop of solvent. The initial measurement is made at a low voltage derived from the variable voltage source 20 and the temperature variation or drift with time observed from the recorded signal. From this temperature variation with time, the drift rate of the temperature of the sample bead is computed and preferably plotted as in the plot of FIG. 2 with the temperature drift rate as the ordinate and input power level as the abscissa.

With the low level of voltage or power input to the bridge 16, and hence to the sample bead 12, the temperature drift rate is normally downward or in a negative-going sense. This is due to the heat losses of the system. Next the voltage level from the source 20 is increased and the drift rate again computed and plotted. This operation is performed repeatedly so as to obtain several different drift rates, denoted by the "x's" 30 in FIG. 2. As will be noted, as the power input to the sample beads 12 and 14 increases, the temperature drift rate of the sample solution becomes less negative. This is because as the sample temperature increases, that is to say, as the heat applied to the sample solution is increased, the heat loss from the sample chamber is more nearly compensated for. With the application of still more external heat, as by increasing the power supplied to the thermistor beads 12 and 14, the temperature change produced by the vapor pressures of the sample solution and solvent can be determined under conditions of thermodynamic equilibrium, i.e., equilibrium is indicated at 32 in FIG. 2 when the sample temperature drift rate is zero.

Within limits, a further increase in power level produces a positive-going temperature drift rate. This condition exists since the heat supplied to the thermodynamic system exceeds the losses and the sample solution is heated. The solvent of the sample solution evaporates and condenses into the solvent in the chamber thereby decreasing the temperature of sample bead 12 but not sufficiently to overcome the increased power input.

If the several points 30 are plotted, as illustrated in FIG. 2, and interconnected by the line 34, the intersection of line 34 with the zero drift rate axis represents the thermodynamic equilibrium. Reference is now had to the temperature difference between the sample and reference beads at thermodynamic equilibrium, i.e., the magnitude of the electrical output of the bridge 16 at the point 32. This point 32 may be computed by interpolating between the adjacent points 30. If the bridge output signal has been recorded, this determination is relatively simple—the temperature may be read directly from the strip chart. Utilizing well known formulae, the molal concentration and the molecular weight of the solute can be obtained by conventional techniques having known the temperature differences.

Although the bridge 16 has been described as utilizing thermister beads 12 and 14, it is to be understood that other temperature sensitive, resistance elements may be employed just as well. For example, a platinum resistance thermometer may be employed. In fact, any suitable temperature sensing element which is capable of receiving input power for application to the sample may be employed. Alternatively, separate heating and temperature sensing elements may be used for the sample and solvent stations in the chamber 10. In one embodiment of the invention the sample may be heated by radiant energy such as infrared energy.

The instrument system shown in FIG. 1 may be automated to seek the zero drift power level utilizing a feedback system such as that shown in FIG. 4. In FIG. 4 the output signal from the bridge 16 is applied to a D.C. amplifier 40, amplified and then applied to a slope detector 42. The slope detector 42 may be any conventional slope detector which is capable of determining the rate of change of the input signal amplitude as a function of time. Any differentiating circuit capable of differentiating signals having relatively low rates of change is suitable. Depending upon whether the differentiated output signal is positive or negative, The slope of the bridge output signal is indicated correspondingly as being positive-going or negative-going. The slope detector 42 should include a suitable logic circuit which observes the differentiated output signal to provide an output level or output voltage on the positive (+) output lead 44 or the negative (—) output lead 45 which voltages are applied through suitable switching circuits illustrated by the block 46 to a reversible servo motor 48.

A suitable slope detector which is capable of performing these functions is described in U.S. Patent 3,359,410 issued Dec. 19, 1967 to C. D. Frisby et al. Another suitable slope detector may be purchased from Hewlett-Packard Company, Palo Alto, Calif. It is designated as Model 3370A.

The switching circuits 46 preferably are operated under the control of a cyclic timing circuit illustrated by the rectangle 52. This timing circuit periodically opens the switches 46 for a period of 7 to 10 seconds which usually is sufficient for the thermistor beads 12 and 14 to stabilize under a new power input condition and then closes the switches for a period of 2 to 3 seconds to permit the servo motor 48, acting under the control of the slope detector 42, to reposition the tap 54 of a potentiometer 56 some preselected incremental amount. This varies the voltage applied to the input terminals 18 of the bridge 16 (FIG. 1). The servo motor is connected through a suitable mechanical linkage, denoted by the dashed line 57, to the tap 54 and also to a suitable indicator denoted by the dial 58. The potentiometer 56 is connected across a suitable source of potential such as the battery 22. The negative side of the battery 22 and the tap 54 of the potentiometer 56 are connected to the respective input terminals of the bridge 16 (FIG. 1). Any suitable electronic switches such as silicon controlled rectifiers or transistors may be used for the switching circuits 46.

In operation the automatic system of FIG. 4 functions to monitor the output signal derived from the bridge 16 and vary the voltage applied to the bridge 16 and hence the heating of the thermistors 12, 14 until the drift rate of the sensed temperature in the sample chamber 10 approaches zero. During the period of time when the switches 46 are closed by the timer 52, the servo motor 48 operates in either a forward or reverse direction to reposition the tap 54 in the sense as necessary to reduce the drift rate of the temperature of the sample bead 12 to zero. The specific operation is such that if the drift rate of the temperature of the sample bead 12 is in a positive-going sense, indicating that the power input to the sample bead is too high, the servo motor decreases the voltage applied to the bridge 16. This decreased voltage correspondingly decreases the heat applied to the solution on the sample bead 12. In the meantime the timing switch 52 has opened to permit the thermistors 12 and 14 to stabilize thermally after which time it again closes, the slope again observed, and the power input corrected as necessary by the servo motor 48. If the slope is again positive-going, the servo motor 48 again decreases the voltage. This sampling type operation occurs repetitively until the drift rate is reduced to zero at which time the slope detector provides no output signal. The servo motor 48 is disabled and the point of thermodynamic equilibrium is achieved. Conversely, if the temperature drift rate is negative-going, indicating that the power input to the sample bead is too low, the voltage applied to the bridge 16 is increased until again the point of thermodynamic equilibrium is attained as previously described.

While the cyclic sensing of the slope is preferred for stability, the slope may be continuously sensed and the voltage or current input adjusted accordingly. In this event, the switch 46 and timing switch 52 are eliminated. Whichever technique is used, at thermodynamic equilibrium, the differential temperature between the sample and reference beads is a measure of the molal concentration of the solution and may be computed using known formulae.

The diagram of FIG. 3 illustrates an alternative embodiment of the invention for sensing thermodynamic equilibrium. In the system of FIG. 3 equilibrium is sensed by continuously observing the weight of the sample. To this end, the sample is disposed in a sample chamber described hereinbefore and illustrated by the dotted rectangle 10. The sample itself is placed in a sample cup 60 formed on one end of a beam 62 of a torsion balance. The torsion balance includes a torsion member 64 which is fixedly secured at either end and supports the torsion beam 62. As is standard in such balances, one end of the member 64 is adjustable to zero the beam after the sample is added. The end of the torsion beam 62 which is opposite to the sample cup 60 includes a flag 66 positioned to partially interrupt a light beam, denoted by the dashed line 68, passing from a suitable light source 70 to a photocell 71. The light source 70 is energized by a suitable electrical source 74. The output of the photocell 71 may be appropriately amplified if necessary and coupled either to the recorder 26 in FIG. 1 or to the amplifier 40 for the automatic zeroing system illustrated in FIG. 4. An adjustable voltage or current source 20 and bridge 16, which may be either manually adjusted as in the embodiment of FIG. 1 or automatically adjusted as in the the embodiment of FIG. 4, is coupled through suitable wires 76 mounted on the torsion member 64 and the beam 62 and thence to the sample thermistor 72 in the sample cup 60. The sample may be in the form of a droplet on the bead element 72 itself or the bead 72 may be immersed in the sample. Heat is applied from the adjustable source 20 directly to the sample solution in the cup 60 through the sample bead 72. Alternatively, separate heating and temperature sensing elements may be disposed contiguous to the sample in cup for heating and sensing the temperature changes. In any event, the output of the bridge is an electrical signal indicative of sample temperature.

In the operation of this system, a small droplet of the sample solution is placed in the sample cup 60 and solvent used in the solution is placed on the sample wick (FIG. 1). The torsion balance is zeroed by adjustment of the torsion member 64. Once zeroed, changes in sample weight may be observed from the photocell output signal. Again, the drift rate resulting from the evaporation of the sample is observed. In this instance, however, the drift rate of the sample weight is observed rather than that of the temperature. The voltage or current applied to the heating element 72 is increased either continuously or by increments until the drift rate of the sample weight approaches zero or at least changes from a positive-going drift to a negative-going drift such that its point of intersection with the zero drift rate axis may be obtained by plotting as described in conjunction with FIG. 2. This point at which zero drift rate is obtained indicates the point of thermodynamic equilibrium. The temperature increase of the sample due to solvent condensation is measured at this point of thermodynamic equilibrium by the bridge 16 and recorded if desired. With a knowledge of the temperature change of the sample and knowing the sample weight, the molal concentration of the sample can be ascertained. In the alternative, the photocell 71 may be coupled directly to the amplifier 40 of FIG. 4 for the purpose of automating the system.

It is to be understood that whereas in the embodiment of FIG. 3 sample weight is observed, this is tantamount to observing sample volume. Hence, it may be said that either weight or volume may be observed in order to determine zero drift rate. Sample volume or size may be observed using conventional optical measurements.

There has thus been described a relatively novel system and method for determining concentrations. In accordance with this system the normal heat losses of a vapor pressure osmometer are compensated by applying heat directly to the sample. This method overcomes the deficiency of many of the prior art systems in that it converts the vapor pressure osmometer from an empirical device into an absolute thermodynamic one. It does this by applying heat to the sample to overcome heat losses and achieve more true thermodynamic equilibrium between the sample solution and solvent.

It will be obvious that various modifications may be made in the apparatus and in the manner of operating it. It is intended to cover such modifications and changes as would occur to those skilled in the art.

What is claimed is:

1. A method of determining the solute concentration of a sample of a material in solution including the steps of:
   placing the sample and the solvent for the sample in a closed region;
   measuring the drift rate of one of the weight, volume and temperature of said sample;
   applying heat to the sample until said drift rate is reduced substantially to zero, thereby to produce thermodynamic equilibrium between the sample and the solvent in said closed region; and
   measuring the difference in temperature between said sample and said solvent, said difference being related to said solute concentration.

2. An instrument for determining solute concentrations comprising:
   a sample chamber;
   first means positioned in said chamber for holding a sample of a solute dissolved in a solvent to form a solution whose solute concentration is desired;
   second means positioned in said chamber for holding the solvent for said solute;
   means for heating said sample and for sensing the temperature difference between said sample and said solvent;
   means for sensing the drift rate of one of the sample weight, sample volume and said temperature difference; and
   means responsive to said drift rate for varying the heat supplied to said sample to reduce said drift rate substantially to zero, thereby to produce thermodynamic equilibrium between said sample and said solvent in said sample chamber;
   whereby the solute concentration of said sample is indicated by said temperature difference when said drift rate is substantially zero.

3. An instrument according to claim 2 wherein said heating and sensing means is a single resistor having a temperature coefficient of resistance, thereby to perform the dual functions of heating said sample and sensing the temperature of said sample.

4. An instrument according to claim 2,
   said heating and sensing means including an electrical heating element contiguous to said first holding means;
   said means for sensing the drift rate including means for generating an electrical signal in response to the rate of change of said temperature difference; and
   said means for varying the heat supplied to said sample including means responsive to said electrical signal for varying electrical power supplied to said heating element to reduce the drift rate of said temperature difference substantially to zero.

5. An instrument according to claim 2,
   said heating and sensing means including an electrical heating element contiguous to said first holding means;
   said means for sensing the drift rate including:
      a balance for weighing said sample solution held by said first holding means; and
      means for generating an electrical signal in response to the rate of change of the weight of said sample; and
   said means for varying the heat supplied to said sample including means responsive to said electrical signal for varying electrical power supplied to said heating element ot reduce the drift rate of said sample weight substantially to zero.

6. An instrument according to claim 2 further including
   means for recording variations in said temperature difference between said sample and said solvent.

References Cited

UNITED STATES PATENTS

| 3,025,706 | 3/1962 | Oppenheim | 73—362 |
| 3,088,319 | 5/1963 | Neumayer. | |
| 3,135,107 | 6/1964 | Paulik et al. | |
| 3,164,982 | 1/1965 | Pasternak et al. | 73—64.3 |

LOUIS R. PRINCE, Primary Examiner

J. W. ROSKOS, Assistant Examiner